United States Patent
Nakatsugawa (10) Patent No.: US 6,260,161 B1
(45) Date of Patent: *Jul. 10, 2001

(54) TROUBLESHOOTING METHOD AND COMMUNICATION SYSTEM

(75) Inventor: Yoshinori Nakatsugawa, Shizuoka (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/098,733

(22) Filed: Jun. 18, 1998

(30) Foreign Application Priority Data

Jun. 19, 1997 (JP) .................................................. 9-162953

(51) Int. Cl.[7] .............................. H02H 3/05; H04B 1/74
(52) U.S. Cl. ............................ 714/48; 370/242; 370/389
(58) Field of Search ........................ 714/48, 53; 370/242, 370/248, 389, 390, 393; 340/825.52

(56) References Cited

U.S. PATENT DOCUMENTS

| 4,546,467 | * | 10/1985 | Yamamoto | 370/245 |
| 4,680,756 | * | 7/1987 | Sugimoto et al. | 370/402 |
| 5,175,730 | * | 12/1992 | Murai | 370/445 |
| 5,305,385 | * | 4/1994 | Schanning et al. | 380/49 |
| 5,384,778 | * | 1/1995 | Okamoto et al. | 370/421 |
| 5,414,813 | * | 5/1995 | Shiobara | 709/245 |
| 5,652,840 | * | 7/1997 | Okamoto et al. | 340/825.52 |

FOREIGN PATENT DOCUMENTS 63-246946    10/1988  (JP) .

* cited by examiner

*Primary Examiner*—Dieu-Minh T. Le
(74) *Attorney, Agent, or Firm*—Oblon, Spivak, McClelland, Maier & Neustadt, P.C.

(57) ABSTRACT

Upon sequentially transmitting plural data frames to one destination address, each communication apparatus inverts "1" or "0" of a switch flag to add a new switch flag to a source address and a destination address, in a flag setting section, and the source address and the destination address added with the new flag are transmitted as a monitor data. Each communication apparatus receives all data frames on a network, and the monitor data of the data frames received in a preceding time and in a present time are compared with each other, in a malfunction detecting section. By the inversion control of the switch flag, the monitor data of the data frames received in the preceding time and in the present time cannot be equal to each other. Therefore, a malfunction specifying section detects a comparison result output indicating coincidence between the monitor data, thereby to detect occurrence of a trouble.

14 Claims, 3 Drawing Sheets

TROUBLESHOOTING METHOD AND COMMUNICATION SYSTEM

BACKGROUND OF THE INVENTION

1. Technical Field of the Invention

The present invention relates to a troubleshooting method and a communication system by which a communication trouble such as mistranslation of data can be detected and a trouble factor can be specified, in a loop-structure network.

2. Prior Art

There is a conventionally known troubleshooting system for a communication apparatus in a loop structure network, as disclosed in Open-laid Japanese Patent Application KOKAI Publication No. 63-246946.

In the troubleshooting system, a monitor communication apparatus sets a monitor indicator in a data frame, and another communication apparatus which receives the data frame resets the monitor indicator when transmitting the data frame. Therefore, in case where the monitor communication apparatus receives a monitor indicator already set, it means that an abnormal data frame which has not been received by any communication apparatus has occurred.

Accordingly, when such an abnormal data frame is detected, the monitor communication apparatus detects the address of the sender or receiver of the abnormal data frame. As a result of this, the communication apparatus which causes the trouble can be specified.

However, in such a troubleshooting system for a communication apparatus in a conventional loop structure network, for example, when a monitor indicator which should have been set and transmitted is reset and transmitted by a trouble in a monitor communication apparatus, even a data frame transmitted from a communication apparatus causing a trouble has a reset monitor display, and therefore, there is a problem that detection of a communication apparatus causing a trouble is impossible.

In addition, in a monitor communication apparatus, the communication apparatus causing a trouble is detected by receiving a data frame having a monitor indicator set as above. As a result of this, there is a problem that it is impossible to detect the communication apparatus causing a trouble in case where a monitor indicator is reluctantly reset and transmitted, even though a trouble is caused in the communication apparatus.

Also, in a monitor communication apparatus, the communication apparatus causing a trouble is detected by receiving a data frame having a set monitor indicator. Therefore, there is a problem that a communication apparatus is erroneously detected as causing a trouble if a monitor indicator reluctantly is set and transmitted even though the communication apparatus does not cause a trouble.

Further, the communication apparatus causing a trouble is specified by detecting the address of a sender or receiver of an abnormal data frame. Therefore, there is a problem that the communication apparatus causing a trouble cannot be correctly detected if the source address or receiver address itself is incorrect.

SUMMARY OF THE INVENTION

The present invention has been made in view of the problem described above, and has an object of providing a troubleshooting method and a communication system in which a communication apparatus that has caused a trouble and a trouble factor thereof can be correctly specified and detected.

In order to achieve the above object, there is provided a troubleshooting method for each of communication apparatuses constituting a loop structure network, comprising the steps of: generating a monitor data including at least a source address, a destination address, and an additional data while changing the additional data so as not to sequentially generate same two monitor data by each of the communication apparatuses; attaching the monitor data to data body to form and transmit a data frame by each of the communication apparatuses; comparing two monitor data with each other attached to a new data frame and a data frame received in a preceding time every time the new data frame is received, by each of the communication apparatuses; and perceiving occurrence of a trouble, when a comparison result indicating coincidence between the two monitor data is detected, by each of the communication apparatuses.

According to a preferred embodiment of the present invention, upon sequentially transmitting plural data frames to one destination address, each of the communication apparatuses generates plural monitor data having plural additional data which are different from each other and transmits each of the plural monitor data together with the data body.

According to a preferred embodiment of the present invention, each of the communication apparatuses generates the monitor data with a different additional data for every transmission of the data frame and transmits the monitor data together with the data body.

According to a preferred embodiment of the present invention, each of the communication apparatuses previously stores address data of the communication apparatuses connected with the loop structure network; and when the comparison result indicating the coincidence between the two monitor data is detected, detects whether or not a destination address included in the monitor data of the new data frame exists in the address data; when the destination address does not exist, determines that a trouble has occurred due to address mistranslation in a communication apparatus positioned adjacently in an upstream side of own communication apparatus; and when the destination address exists, has predetermined communication with a communication apparatus designated by the destination address thereby to determine whether or not the designated communication apparatus is capable of receiving data, and then when the designated communication apparatus is capable of receiving data, determines that a trouble due to destination address mistranslation has occurred in a communication apparatus positioned adjacently in an upstream side of own communication apparatus and when the designated communication apparatus is not capable of receiving data, determines that a trouble has occurred due to a receiving error in the designated communication apparatus.

According to a preferred embodiment of the present invention, each of the communication apparatuses previously stores address data of the communication apparatuses connected with the loop structure network; and when the comparison result indicating the coincidence between the two monitor data is detected, detects whether or not a source address included in the monitor data of the new data frame exists in the address data; when the source address exists, detects whether or not a destination address included in the monitor data of the new data frame exists in the address data, and then when the destination address does not exist, determines that a trouble due to destination address mistranslation has occurred in a communication apparatus positioned adjacently in an upstream side of own communication apparatus and when the destination address exists, has predetermined communication with a communication apparatus designated by the destination address thereby to determine whether or not the designated communication apparatus is capable of receiving data, and then when the designated communication apparatus is capable of receiving data, determines that a trouble due to destination address mistranslation has occurred in a communication apparatus positioned adjacently in an upstream side of own communication apparatus and when the designated communication apparatus is not capable of receiving data, determines that a trouble has occurred due to a receiving error in the designated communication apparatus; when the source address does not exist, detects whether or not a destination address included in the monitor data of the new data frame exists in the address data, and then when the destination address does not exist, determines that a trouble due to destination address mistranslation and source address mistranslation has occurred in a communication apparatus positioned adjacently in an upstream side of own communication apparatus and when the destination address exists, determines that a trouble due to destination address mistranslation has occurred in a communication apparatus positioned adjacently in an upstream side of own communication apparatus as well as a trouble has occurred due to a receiving error in the designated communication apparatus.

According to a preferred embodiment of the present invention, when a comparison result indicating disagreement of the two monitor data is detected, each of the communication apparatuses detects a source address included in the monitor data of the new data frame; when the source address exists, replies response data indicating receipt of transmitted data to a communication apparatus corresponding to the source address; and when the source address does not exist, directly transmits the new data frame to a communication apparatus positioned adjacently in a downstream side of own communication apparatus.

According to a preferred embodiment of the present invention, when a comparison result indicating disagreement of the two monitor data is detected, each of the communication apparatuses detects a destination address included in the monitor data of the new data frame; and when the destination address corresponds to own communication apparatus which has received the new data frame, replies response data indicating receipt of transmitted data to a communication apparatus corresponding to the source address.

In order to achieve the above object, there is also provided a communication system constituting a loop structure network by connecting a plurality of communication apparatuses through a ring-like transmission path, each of the communication apparatuses comprising: an additional data generation means for generating a monitor data including at least a source address, a destination address, and an additional data while changing the additional data so as not to sequentially generate same two monitor data; a transmission means for attaching the monitor data to data body to form and transmit a data frame; a comparison means for comparing two monitor data with each other attached to a new data frame and a data frame received in a preceding time every time the new data frame is received; and a troubleshooting means for perceiving occurrence of a trouble when a comparison result indicating coincidence between the two monitor data is detected.

The troubleshooting method and communication system as described above are arranged so as to transmit data frame while changing the additional data so that the data frame to be transmitted do not have a monitor data equal to one received in a preceding time. Therefore, in case where two same monitor data are detected sequentially, this can detected as occurrence of a trouble.

Specifically, when a trouble has occurred, the trouble can be detected in a communication apparatus situated adjacently in the downstream side of the communication apparatus which has caused the trouble.

The nature, principle and utility of the invention will become more apparent from the following detailed description when read in conjunction with the accompanying drawings.

DETAILED DESCRIPTION OF THE INVENTION

In the following, explanation will be specifically made of preferred embodiments of a troubleshooting method and a communication system according to the preset invention.

The troubleshooting method and communication system according to the present invention are applicable to a network system having a so-called loop structure. The network system of the embodiment is constructed by connecting a plurality of communication apparatuses 1 shown in FIG. 1 in form of a loop.

Figure 1:
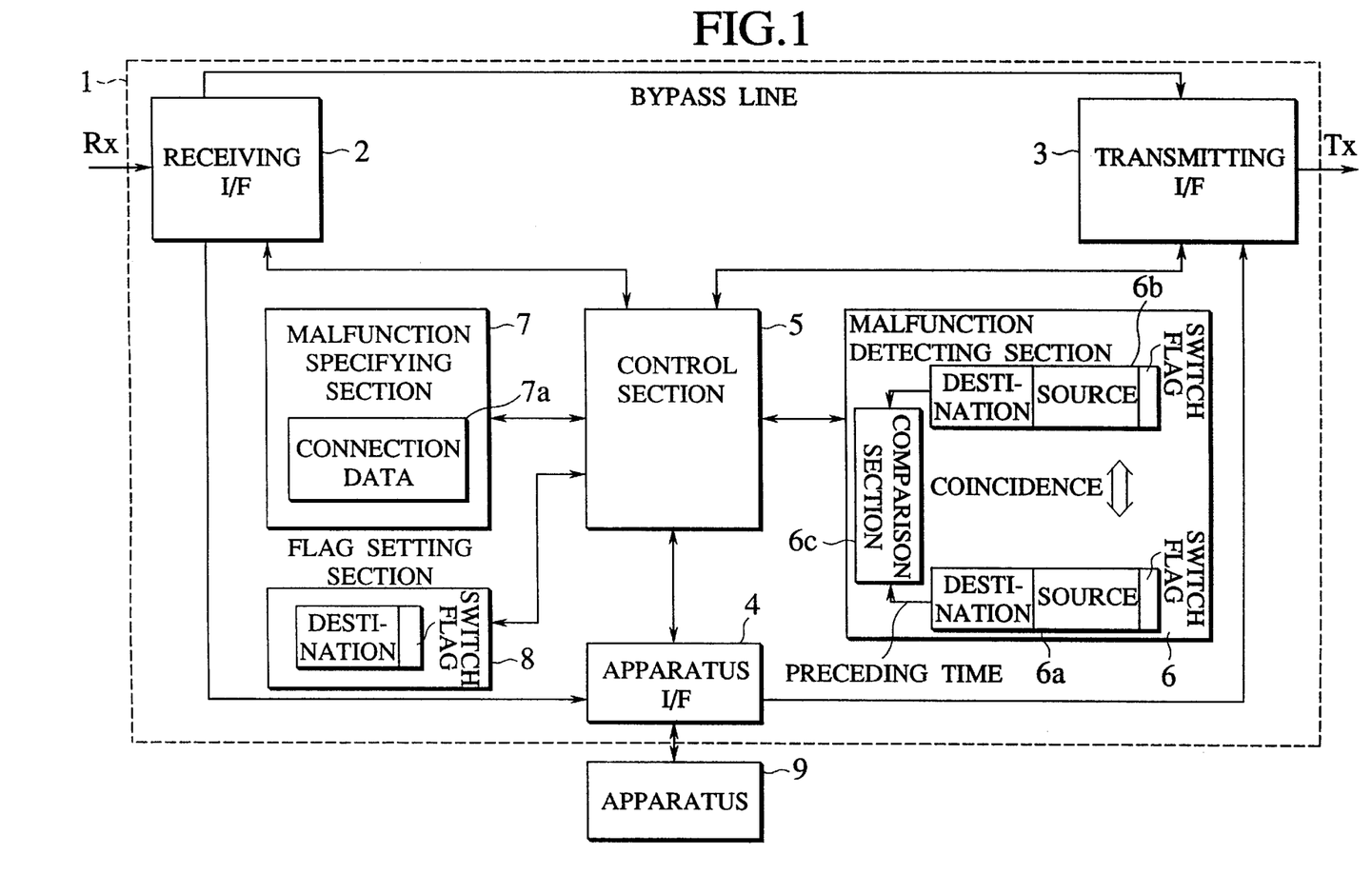
FIG. 1 is a block diagram of a communication apparatus provided in a network system of a loop structure to which an embodiment of the troubleshooting method and communication system according to the present invention is applied.
Figure 2:
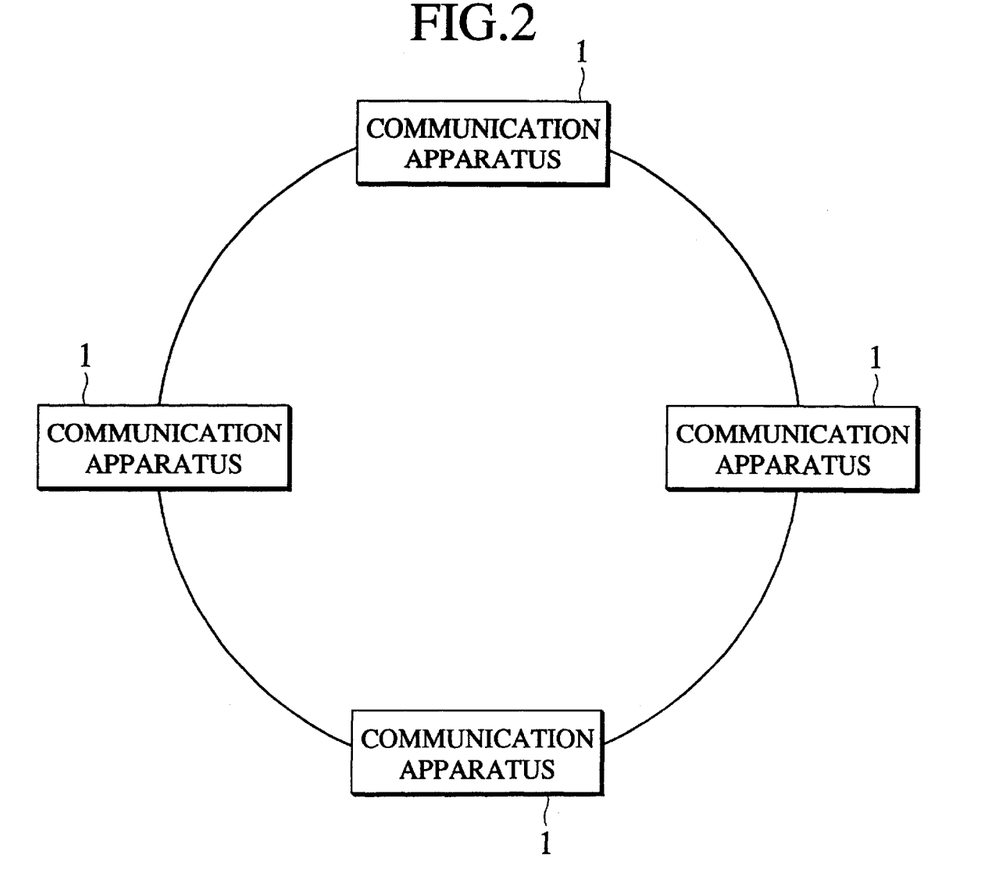
FIG. 2 is a view showing a network system of a loop structure.

A communication apparatus 1 comprises a receiving interface 2 (which will be hereinafter referred to as a receiving I/F) for receiving a data frame transmitted from another communication apparatus, a transmitting interface 3 (which will be hereinafter referred to as a transmitting I/F) connected to the receiving I/F 2 by a bypass line to transmit a data frame from the communication apparatus 1, and a device interface 4 (which will be hereinafter referred to as a device I/F).

Also, the communication apparatus 1 comprises a malfunction detecting section 6 for comparing a data frame received in a preceding time with a data frame received in a present time, a malfunction specifying section 7 for specifying the communication apparatus that has caused a trouble and the trouble factor of the trouble on the basis of connection data in the network if a comparison output from the malfunction detecting section 6 indicates occurrence of a trouble, a flag setting section 8 for forming a new "switch flag" by inverting "1" or "0" of a "switch flag" as an additional data added to a destination address when sequentially transmitting the same data frame to one same destination address, and a control section 5 for controlling the communication apparatus 1 as a whole.

Next, explanation will be made of the operation of a network system of the embodiment having a structure described above.

At first, in the network system, a plurality of communication apparatuses 1 are connected in form of a loop through a ring-like communication path, and each communication apparatus 1 receives all the data frames transmitted from an adjacent communication apparatus connected in the stage of the upstream side.

Figure 3:
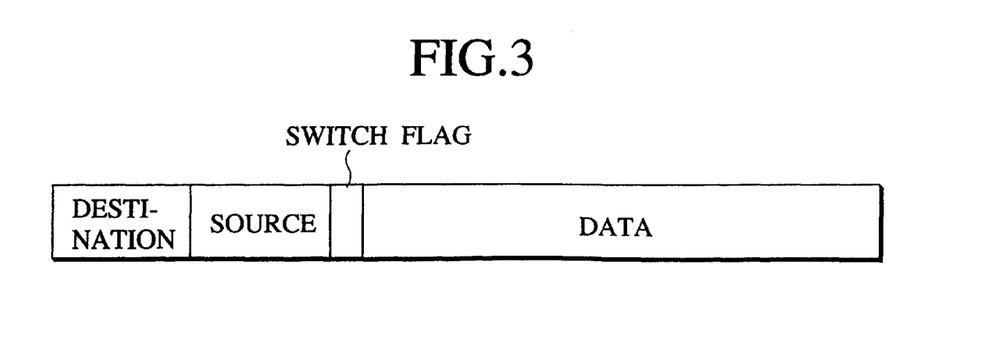
FIG. 3 is a graph showing the format of a data frame transmitted in a network system of a loop structure.

A data frame transmitted through the ring-like transmission path consists of a destination address generated by the control section 5 of each communication apparatus 1 as shown in FIG. 3, a source address, a switch flag generated by the flag setting section 8, and data to be transmitted.

The flag setting section 8 comprises, for example, a first memory section for storing a preceding destination address, a second memory section for storing a present destination address, a comparison section for comparing the destination addresses stored in the memory sections with each other, and a switch flag generating section for inverting "1" or "0" of the switch flag on the basis of a comparison output therefrom to generate a new switch flag, so that "1" or "0" of the switch flag is inverted and supplied to the control section 5 if the switch flag generating section detects a comparison output indicating coincidence of the destination addresses stored in the memory sections with each other from the comparison section.

The control section 5 generates a monitor data by adding the switch flag to the destination address and the source address, and adds the monitor data to data to be transmitted. Further, the control section 5 transmits a data frame added with the monitor data, to another communication apparatus, through a transmitting I/F 3.

In the flag setting section 8, "1" or "0" of the switch flag may be inverted every time when a data frame is transmitted, regardless of the destination address.

Monitor data of a data frame thus transmitted is supplied to the control section 5 through the receiving I/F 2 of each communication apparatus 1 shown in FIG. 1. The control section 5 supplies the monitor data to the malfunction detecting section 6.

The malfunction detecting section 6 comprises a first memory section 6a for storing monitor data received in a preceding time, a second memory section 6b for storing a monitor data item received in a present time, and a comparison section 6c for comparing the monitor data (including a destination address, a source address, and a switch flag) stored in the memory section 6a with those stored in the memory section 6b. The comparison section 6c compares the monitor data received in a preceding time with the monitor data received in a present time in the respective memory sections 6a and 6b, and supplies a comparison output through the control section 5 to the malfunction specifying section 7.

The flag setting section 8 of each communication apparatus inverts "1" or "0" of a switch flag when a data frame is transmitted to one same destination address. Therefore, a comparison output from a comparison section 6c, between the monitor data received in a preceding time and the monitor data received in a present time, must inherently indicate disagreement. Therefore, if the comparison output indicates coincidence between the monitor data, the comparison output means that monitor data sustains data mistranslation.

Figure 4:
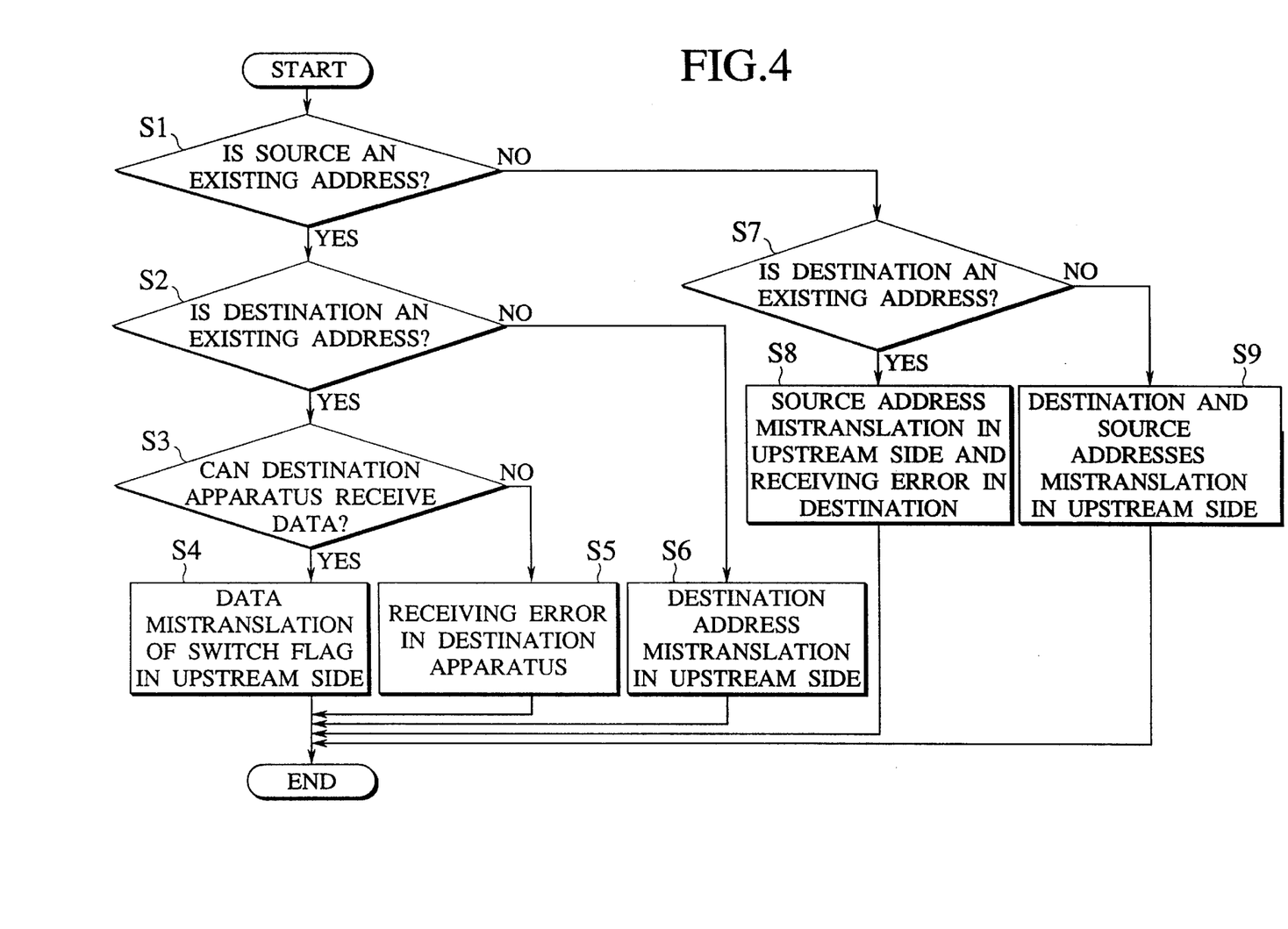
FIG. 4 is a flowchart showing troubleshooting operation of a communication apparatus.

Upon supply of a comparison output indicating disagreement of monitor data items from the malfunction detecting section 6, the malfunction specifying section 7 operates in accordance with the flowchart shown in FIG. 4, and specifies and detects a communication apparatus causing the trouble and the trouble factor thereof.

That is, the flowchart shown in FIG. 4 is started and goes to a step 1, when a comparison output indicating coincidence between monitor data items is supplied from the malfunction detecting section 6.

In a step S1, the malfunction specifying section 7 determines whether or not a source address added to the data frame received in a present time is an address of any communication apparatus in the network.

Specifically, in the connection data memory 7a of the malfunction specifying section 7, addresses of all communication apparatuses in addition to the address of a communication apparatus situated adjacently in the upstream side of the communication apparatus provided with the very malfunction specifying section 7 are stored as connection data. Therefore, based on the connection data stored in the connection data memory 7a, the malfunction specifying section 7 determines whether or not the source address added to the data frame received in a present time is an address of any communication apparatus in the network. If the source address is an address of any communication apparatus in the network (Yes), the flow goes to a step S2. If the source address is not an address of any communication apparatus in the network (No), the flow goes to a step S7.

Next, after it is determined that a communication apparatus corresponding to the source address exists in the network in the step S1, the malfunction specifying section 7 goes to the step S2 and determines whether the destination address added to the data frame received in a present time corresponds to an address of any communication apparatus in the network. If Yes, the flow then goes to a step S3. If No, the flow goes to a step S6.

In the step S3, since both of the source address (in the step S1) and the destination address (in the step S2) indicate addresses of communication apparatuses existing in the network, the malfunction specifying section 7 communicates with the communication apparatus designated by the destination address added to the data frame and determines whether or not the communication apparatus indicated by the destination address is capable of correctly receiving a data frame (e.g., by sending any request to the communication apparatus indicated by the destination address and by determining whether or not an answer is correctly returned therefrom). If Yes, the flow goes to a step S4. If No, the flow goes to a step S5.

Thus, there is a fact that the communication apparatus indicated by the destination address is capable of correctly receiving a data frame, i.e., a fact that coincidence is detected between the monitor data of the data frame received in a preceding time and the monitor data of the data frame received in a present time in spite of both of the existing source address (in the step S1) and destination address (in the step S2) and in spite of correct operation of the communication apparatus designated by the destination address (in the step S3). This fact indicates that data mistranslation concerning a switch flag has occurred in a communication apparatus situated adjacently in the upstream side. Therefore, in the step S4, the malfunction specifying section 7 determines that a trouble has occurred due to data mistranslation concerning a data flag in the communication apparatus situated adjacently in the upstream side and ends all the routines in the flowchart shown in FIG. 4.

In the step S3 described above, if it is determined that the communication apparatus designated by the destination address is not capable of receiving a data frame although both the source address (in the step S1) and destination address (in the step S2) exist (i.e., if No is determined), the malfunction specifying section 7 makes the flow go to a step S5. Thus, this state indicates that correct communication cannot be made with the communication apparatus as a destination. Therefore, the malfunction specifying section 7 makes the flow goes to the step S5 at the time point when the communication apparatus as the destination is not capable of receiving a data frame. The section 7 determines that a trouble has occurred due to incapability of receipt in the communication apparatus as a destination, and ends all the routines of the flowchart shown in FIG. 4.

In the step S2 described above, if the source address (in the step S1) exists and the destination address (in the step S2) is an address of a communication apparatus other than the communication apparatuses in the network system, the malfunction specifying section 7 makes the flow go to a step S6. Any destination address added to a data frame, however, cannot be an address of a communication apparatus other than the apparatuses in the network system. Therefore, the malfunction specifying section 7 in the step S6 determines that a trouble has occurred due to address mistranslation of a destination address in a communication apparatus situated adjacently in the upstream side, erases the data frame, and ends all the routines of the flowchart shown in FIG. 4.

In this manner, it is possible to prevent a problem (or an endless loop) that a data frame having a destination address designated to a communication apparatus not existing in the network continues endlessly looping in the network.

In the step S1 described above, if it is determined that a data frame is added with a source address indicating a communication apparatus not existing in the network, the malfunction specifying section 7 makes the flow go to a step S7 and determines whether the destination address added to the data frame is an address of any communication apparatus in the network. In the step S7, if it is then determined that no source address (in the step S1) exists but a destination address (in the step S7) exists (i.e., if Yes), the flow goes to a step S8. If it is determined that neither a source address nor a destination address exists (i.e., if No), the flow goes to a step S9.

The step S8 is to be started if the source address of the communication apparatus which has sent the data frame is unknown but a destination address exists. The fact that the data frame is not received in spite of existence of a destination address indicates that the communication apparatus corresponding to the destination address has caused a trouble and has been incapable of receiving the data frame.

Therefore, when the flow goes to the step S8, the malfunction specifying section 7 gives a certain request to the communication apparatus designated by the destination address added to the data frame and determines whether or not an answer is replied in response to the request, thereby to determine whether or not the communication apparatus designated by the destination address is correctly capable of receiving a data frame. If the communication apparatus is capable of correctly receiving the data frame, the data frame added with an unknown source address is directly transmitted (passed through as it is) since the destination address is known. If it is otherwise determined that the communication apparatus designated by the destination address is not capable of correctly receiving a data frame, it is determined that a trouble due to address mistranslation of the source address has occurred in a communication apparatus situated adjacently in the upstream side and that the communication apparatus designated by the destination address has caused a receiving error, and all the routines of the flowchart shown in FIG. 4 are ended.

In contrast, the step S9 is taken if nether a source address (in the step S1) nor a destination address (in the step S7) exists. Both of a source address and a destination address added to a data frame transmitted from a communication apparatus existing in the network system cannot belong to any other communication apparatus than the communication apparatuses existing in the network system.

Therefore, the malfunction specifying section 7 which has entered into the step S9 determines that a trouble due to address mistranslation of a source address and a destination address has occurred in a communication apparatus situated adjacently in the upstream side of the communication apparatus. The section 7 erases the data frame and ends all the routines of the flowchart shown in FIG. 4.

In this manner, it is possible to prevent a problem (of an endless loop) that a data frame having no destination address endlessly loops in the network.

The above explanation has been made with reference to a case where the malfunction detecting section 6 detects coincidence between monitor data of a data frame received in a precious time and monitor data of a data frame received in a present time. In case where disagreement exists therebetween, each communication apparatus 1 operates as follows.

Specifically, in most cases, disagreement between monitor data items of the data frames means that data communication is correctly performed, and therefore, each communication apparatus 1 transmits a received data frame to a succeeding communication apparatus. However, for example, in case where a destination address is mistranslated into a destination address of a communication apparatus other than the communication address which is desired to receive a data frame, disagreement between monitor data items is detected in the communication apparatus which has received the data frame, causing a problem that the data frame is treated through correct data communication.

Accordingly, where a communication apparatus 1 detects a destination address designating itself and detects disagreement between monitor data items, the control section 5 detects a source address of a data frame newly received in order to confirm whether or not a data frame has been actually transmitted correctly after receiving the data frame. Then, if a source address exists, a response data item (ACK/NCK) indicating receipt of the data frame is transmitted to the communication apparatus corresponding to the source address.

If the destination address has sustained data mistranslation, the communication apparatus which has transmitted the data frame detects a communication error since a response data item is transmitted from a communication apparatus which should have not received the data frame.

In case where no source address exists, the data frame is directly transmitted to a communication apparatus in the down stream side. Then, a trouble is detected in a communication apparatus in the downstream side, like the step S1 described above, since no source address exists. Further, the communication apparatus causing the trouble and the trouble factor thereof are specified by the same operation as in the routines in the step S7 and step S8 or step S9.

If the communication apparatus causing a trouble and the trouble factor are thus specified, each communication apparatus 1 transmits data indicating the communication apparatus causing the trouble and the trouble factor thereof, to a central control apparatus connected to the network. Upon receipt of the data, the central control apparatus controls each communication apparatus 1 so as to make a corresponding countermeasure, e.g., the central control apparatus controls the communication apparatus causing a trouble to make it transmit received data frame to a communication apparatus in the downstream side through the bypass line, as shown in FIG. 1.

Otherwise, a communication apparatus which has detected a trouble transmits data indicating the communication apparatus causing a trouble and the trouble factor thereof, to the other communication apparatuses. The communication apparatuses which has received the data make a corresponding countermeasure. If only the central control apparatus is arranged to perform control of each communication apparatus 1 in case where a malfunction has occurred, a problem will occur where the central control apparatus itself causes a trouble. However, if each communication apparatus 1 is arranged to be able to make a corresponding countermeasure, such a problem can be prevented.

The contents of control made by each communication apparatus 1 has been explained, for example, with reference to a case where a switch flag has sustained data mistranslation. The switch flag itself, however, does not at all relate to data itself. In this case, an example of processing therefore will be such that each communication apparatus 1 is controlled so as to perform data processing regardless of the switch flag with respect to a data frame from the communication apparatus which has caused the trouble.

As is apparent from the above explanation, in the network system, "1" or "0" of a received switch flag is inverted to transmit a new switch flag and each communication apparatus 1 receives all the data frames on the network, in case where data frames are sequentially transmitted to one same destination. Further, each communication apparatus compares monitor the data of a data frame received in a preceding time with monitor data of a data frame received in a present time, and perceives occurrence of a trouble if coincidence between the monitor data items of both data frames is detected.

In this manner, the communication apparatus causing a trouble and the trouble factor thereof can be detected by a communication apparatus situated adjacently in the downstream side.

Even in case where disagreement between monitor data items of data frames is detected, each communication apparatus transmits a response data item to a communication apparatus as a source to make confirmation, based on a source address attached to the data frame. Therefore, a receiving error in a destination can be detected by the source.

In the explanation described above, upon detection of coincidence between monitor data items, whether or not a source address exists is detected at first in the step S1 and the flow then goes to the step S2 or S7 on the basis of a detection result, in the flowchart shown in FIG. 4. However, the flow may be arranged as follows. I.e., whether or not a destination address exists is detected at first (which corresponds to the step S2 described above) when coincidence between monitor data items is detected. Then if no destination address exists, it is determined that a trouble due to address mistranslation has occurred in a communication apparatus situated adjacently in the upstream side of the communication apparatus (which corresponds to the step S6 described above). Otherwise, if a destination address exists, whether or not the communication apparatus as the destination is capable of receiving a data frame is determined (which corresponds to the step S3 described above). If the communication apparatus as the destination is then determined to be capable of receiving a data frame, it is determined that a communication trouble has occurred in a communication apparatus situated adjacently in the upstream side (which corresponds to the step S4). Otherwise, if the communication apparatus as the destination is then determined to be incapable of receiving a data frame, it is determined that a trouble has been caused by a receiving error of the communication apparatus as the destination.

In this manner, all the routines of the flowchart shown in FIG. 4 may be simplified into steps S2 to S6, and the routine for detecting a trouble and for specifying a trouble factor can thus be simplified.

At last, the embodiment described above is merely an example of the present invention. Therefore, the present invention is not limited to the embodiment described above but may naturally be modified variously in compliance with design or the like without deviating from a scope of the technical concept according to the present invention.

The troubleshooting method and communication system according to the present invention are capable of correctly detecting specifically a communication apparatus which has caused a trouble and a trouble factor thereof.

Also, it is possible to prevent endless looping of data due to mistranslation of a destination address.

It should be understood that many modifications and adaptations of the invention will become apparent to those skilled in the art and it is intended to encompass such obvious modifications and changes in the scope of the claims appended hereto.

What is claimed is:

1. A troubleshooting method for each of communication apparatuses constituting a loop structure network, comprising the steps of:
   generating a monitor data in any one of the communication apparatuses including at least a source address, a destination address, and a switch flag that is changed so as not to consecutively generate a same monitor data;
   attaching the monitor data to a data body to form a data frame;
   transmitting the data frame from said any one of the communication apparatuses;
   comparing monitor data attached to a new data frame with monitor data attached to a preceding data frame received in a preceding time every time the new data frame is received, in each of the communication apparatuses; and
   perceiving occurrence of a trouble, when a comparison result indicating coincidence between the monitor data compared is detected, in each of the communication apparatuses.

2. A troubleshooting method according to claim 1, wherein, upon consecutively transmitting plural data frames to one destination address, said any one of the communication apparatuses generates plural monitor data having plural switch flags, each of the plural monitor data being different from a preceding monitor data and transmits each of the plural monitor data together with a data body.

3. A troubleshooting method according to claim 1, wherein each of the communication apparatuses generates the monitor data with a different switch flag for every transmission of the data frame and transmits the monitor data together with the data body.

4. A troubleshooting method according to claim 1, wherein:
   each of the communication apparatuses previously stores address data of the communication apparatuses connected with the loop structure network; and when the comparison result indicating the coincidence between the compared monitor data is detected, detects whether or not a destination address included in the monitor data of the new data frame exists in the address data;

when the destination address does not exist, determines that a trouble has occurred due to address mistranslation in a communication apparatus positioned adjacently in an upstream side of own communication apparatus; and when the destination address exists, has predetermined communication with a communication apparatus designated by the destination address thereby to determine whether or not the designated communication apparatus is capable of receiving data, and then when the designated communication apparatus is capable of receiving data, determines that a trouble due to destination address mistranslation has occurred in a communication apparatus positioned adjacently in an upstream side of own communication apparatus and when the designated communication apparatus is not capable of receiving data, determines that a trouble has occurred due to a receiving error in the designated communication apparatus.

5. A troubleshooting method according to claim 1, wherein:

each of the communication apparatuses previously stores address data of the communication apparatuses connected with the loop structure network; and when the comparison result indicating the coincidence between the compared monitor data is detected, detects whether or not a source address included in the monitor data of the new data frame exists in the address data;

when the source address exists, detects whether or not a destination address included in the monitor data of the new data frame exists in the address data, and then when the destination address does not exist, determines that a trouble due to destination address mistranslation has occurred in a communication apparatus positioned adjacently in an upstream side of own communication apparatus and when the destination address exists, has predetermined communication with a communication apparatus designated by the destination address thereby to determine whether or not the designated communication apparatus is capable of receiving data, and then when the designated communication apparatus is capable of receiving data, determines that a trouble due to destination address mistranslation has occurred in a communication apparatus positioned adjacently in an upstream side of own communication apparatus and when the designated communication apparatus is not capable of receiving data, determines that a trouble has occurred due to a receiving error in the designated communication apparatus;

when the source address does not exist, detects whether or not a destination address included in the monitor data of the new data frame exists in the address data, and then when the destination address does not exist, determines that a trouble due to destination address mistranslation and source address mistranslation has occurred in a communication apparatus positioned adjacently in an upstream side of own communication apparatus and when the destination address exists, determines that a trouble due to destination address mistranslation has occurred in a communication apparatus positioned adjacently in an upstream side of own communication apparatus as well as a trouble has occurred due to a receiving error in the designated communication apparatus.

6. A troubleshooting method according to claim 1, wherein:

when a comparison result indicating disagreement of the compared monitor data is detected, each of the communication apparatuses detects a source address included in the monitor data of the new data frame;

when the source address exists, replies response data indicating receipt of transmitted data to a communication apparatus corresponding to the source address; and when the source address does not exist, directly transmits the new data frame to a communication apparatus positioned adjacently in a downstream side of own communication apparatus.

7. A troubleshooting method according to claim 1, wherein:

when a comparison result indicating disagreement of the compared monitor data is detected, each of the communication apparatuses detects a destination address included in the monitor data of the new data frame; and when the destination address corresponds to own communication apparatus which has received the new data frame, replies response data indicating receipt of transmitted data to a communication apparatus corresponding to the source address.

8. A communication system constituting a loop structure network by connecting a plurality of communication apparatuses through a ring-like transmission path, each of the communication apparatuses comprising:

a monitor data generation means for generating a monitor data including at least a source address, a destination address, and a switch flag that is changed so as not to consecutively generate same two monitor data;

a transmission means for attaching the monitor data to a data body to form a data frame and for transmitting said data frame;

a comparison means for comparing monitor data attached to a new data frame and a preceding data frame received in a preceding time every time the new data frame is received; and a troubleshooting means for perceiving occurrence of a trouble when a comparison result indicating coincidence between the monitor data compared is detected.

9. A communication system according to claim 8, wherein the monitor data generation means, upon consecutively transmitting plural data frames to one destination address, generates plural monitor data having plural switch flags in which each consecutive switch flag is different from a preceding switch flag.

10. A communication system according to claim 8, wherein the monitor data generation means generates the monitor data with a different switch flag for every consecutive transmission of the data frame.

11. A communication system according to claim 8, wherein:

each of the plurality of communication apparatuses comprises a memory means for previously storing address data of the communication apparatuses connected with the loop structure network; and the troubleshooting means, when the comparison result indicating the coincidence between the compared monitor data is detected, detects whether or not a destination address included in the monitor data of the new data frame exists in the address data; when the destination address does not exist, determines that a trouble has occurred due to address mistranslation in a communication apparatus positioned adjacently in an upstream side of own communication apparatus; and when the destination address exists, has predetermined communication with a communication apparatus designated by the destination address thereby to determine whether or not the designated communication apparatus is capable of receiving data, and then when the designated communication apparatus is capable of receiving data, determines that a trouble due to destination address mistranslation has occurred in a communication apparatus positioned adjacently in an upstream side of own communication apparatus and when the designated communication apparatus is not capable of receiving data, determines that a trouble has occurred due to a receiving error in the designated communication apparatus.

12. A communication system according to claim 8, wherein:

each of the plurality of communication apparatuses comprises a memory means for previously storing address data of the communication apparatuses connected with the loop structure network; and the troubleshooting means, when the comparison result indicating the coincidence between the compared monitor data is detected, detects whether or not a source address included in the monitor data of the new data frame exists in the address data; when the source address exists, detects whether or not a destination address included in the monitor data of the new data frame exists in the address data, and then when the destination address does not exist, determines that a trouble due to destination address mistranslation has occurred in a communication apparatus positioned adjacently in an upstream side of own communication apparatus and when the destination address exists, has predetermined communication with a communication apparatus designated by the destination address thereby to determine whether or not the designated communication apparatus is capable of receiving data, and then when the designated communication apparatus is capable of receiving data, determines that a trouble due to destination address mistranslation has occurred in a communication apparatus positioned adjacently in an upstream side of own communication apparatus and when the designated communication apparatus is not capable of receiving data, determines that a trouble has occurred due to a receiving error in the designated communication apparatus; when the source address does not exist, detects whether or not a destination address included in the monitor data of the new data frame exists in the address data, and then when the destination address does not exist, determines that a trouble due to destination address mistranslation and source address mistranslation has occurred in a communication apparatus positioned adjacently in an upstream side of own communication apparatus and when the destination address exists, determines that a trouble due to destination address mistranslation has occurred in a communication apparatus positioned adjacently in an upstream side of own communication apparatus as well as a trouble has occurred due to a receiving error in the designated communication apparatus.

13. A communication system according to claim 8, wherein:

the troubleshooting means, when a comparison result indicating disagreement of the compared monitor data is detected, detects a source address included in the monitor data of the new data frame; and then when the source address exists, replies response data indicating receipt of transmitted data to a communication apparatus corresponding to the source address; and when the source address does not exist, directly transmits the new data frame to a communication apparatus positioned adjacently in a downstream side of own communication apparatus.

14. A communication system according to claim 8, wherein:

the troubleshooting means, when a comparison result indicating disagreement of the compared monitor data is detected, detects a destination address included in the monitor data of the new data frame; and then when the destination address corresponds to own communication apparatus which has received the new data frame, replies response data indicating receipt of transmitted data to a communication apparatus corresponding to the source address.

* * * * *

UNITED STATES PATENT AND TRADEMARK OFFICE
CERTIFICATE OF CORRECTION

PATENT NO.    : 6,260,161 B1
DATED         : July 10, 2001
INVENTOR(S)   : Yoshinori Nakatsugawa It is certified that error appears in the above-identified patent and that said Letters Patent is hereby corrected as shown below:

Column 4,
Line 2, after "can" insert -- be --.
Line 32, change "preset" to -- present --.

Column 7,
Line 66, change "nether" to -- neither --.

Column 8,
Line 60, after "apparatus" insert -- is --.
Line 61, change "are" to -- is --.

Column 9,
Line 9, change "has" to -- have --.

Signed and Sealed this

Fifth Day of March, 2002

*Attest:*

*Attesting Officer*

JAMES E. ROGAN
*Director of the United States Patent and Trademark Office*